United States Patent [19]

Saotome et al.

[11] Patent Number: 4,705,244
[45] Date of Patent: Nov. 10, 1987

[54] TUBE PROTECTING DEVICE

[75] Inventors: Kaoru Saotome, Toyota; Hiroyuki Sasaki; Katsuhiro Kanbara, both of Okazaki, all of Japan

[73] Assignees: Toyota Jidosha Kabushiki Kaisha; Nihon Sekiso Kogyo; Maruyasu Industries Co., Ltd., all of Aichi, Japan

[21] Appl. No.: 865,273

[22] Filed: May 21, 1986

[30] Foreign Application Priority Data

May 23, 1985 [JP] Japan ............................ 60-76928[U]

[51] Int. Cl.⁴ ............................................ F16M 13/00
[52] U.S. Cl. ..................... 248/68.1; 248/73; 248/74.2; 248/222.2
[58] Field of Search .................. 248/49, 65, 68.1, 73, 248/213.2, 220.2, 222.1, 222.2, 316.7, 74.2; 24/290, 291; 296/37.6

[56] References Cited

U.S. PATENT DOCUMENTS

| 1,852,598 | 4/1932 | Vogt | 248/222.2 |
| 2,528,358 | 10/1950 | Grass | 248/222.2 |
| 3,273,844 | 9/1966 | Hodson | 248/222.2 |
| 3,367,286 | 2/1968 | Jantzen | 248/222.2 |
| 3,695,568 | 10/1972 | Hogrebe | 248/222.2 |
| 3,916,089 | 10/1975 | Sloan | 248/73 |
| 4,308,961 | 1/1982 | Kunce | 248/222.2 |
| 4,391,376 | 7/1983 | Finnegan | 248/73 |
| 4,441,619 | 4/1984 | Gibitz | 248/222.1 |

FOREIGN PATENT DOCUMENTS

| 2306969 | 11/1973 | Fed. Rep. of Germany | 248/68 R |
| 2911884 | 10/1980 | Fed. Rep. of Germany | 248/65 |
| 43-28569 | 11/1968 | Japan . | |
| 98178 | 10/1974 | Japan . | |
| 53181 | 9/1980 | Japan . | |
| 35783 | 3/1984 | Japan . | |
| 56873 | 9/1944 | Netherlands | 248/73 |
| 1021496 | 3/1966 | United Kingdom | 248/74.2 |

Primary Examiner—J. Franklin Foss
Assistant Examiner—Robert A. Olson
Attorney, Agent, or Firm—Parkhurst & Oliff

[57] ABSTRACT

A tube protecting device comprising: a clamp support having first and second end portions and at least one clamp element attached thereto, the first end portion being bent to protrude away from the remainder of the clamp support; tube protecting means having a spring portion, a recess portion and an engageable end portion, the spring portion biasing the first end portion of the clamp support into engagement with the recess, the second end portion of the clamp support engaging the engageable end portion of the tube protecting means.

9 Claims, 7 Drawing Figures

TUBE PROTECTING DEVICE

BACKGROUND OF THE INVENTION

1. Field of the Invention

This invention relates to improvements in a tube protecting device for covering a plurality of tube pipings to protect the same in a motor vehicle or the like.

2. Description of the Prior Art

When tubes for fuel supply and/or tubes for brake oil are arranged through the bottom portion of a vehicle body in a motor vehicle, these tubes must be protected from flying stones and spashes of mud, which are spattered by tires.

In many vehicles, as a means for obviating this problem, a tube protector made of metal or synthetic resin is secured thereto.

There are three procedures of mounting the above-described protector. In a first procedure, the tube pipings are first fixed to the vehicle, and thereafter, the protector is mounted to the vehicle. In a second procedure, the tube pipings are first fixed to the vehicle, and, the protector is provisionally fastened to the tubes, and thereafter, secured to the vehicle. In a third procedure, the protector is provisionally fastened to the tube pipings in advance, and then, the tube pipings are fixed to the vehicle, respectively.

The first and the second procedures present such a disadvantage that, since the two mounting steps are required, the operation is complicated and fastening portions are increased in number, whereby the manufacturing cost is raised.

According to the third procedure, a single step suffices. However, as disclosed in Japanese Utility Model Laid-Open (Kokai) Nos. 53181/1982 and 35783/1984 (Refer to FIG. 7) for example, the protector 1 is provisionally fastened to the tube 2 such that the tube 2 is embraced by a cut piece 4. Since this cut piece 4 is integrally extended from the interior of the protector 1 made of synthetic resin through a hinge 3, the protector 1 tends to fall off due to the breakage and the like of the hinge 3 and to be shifted in position.

SUMMARY OF THE INVENTION

The present invention has as its object to provide a tube protecting device capable of being easily and reliably mounted and being not easily shifted in position in the mounted state.

To this end, the present invention contemplates that, in a tube protecting device for covering surfaces at one side of a plurality of tubes fixed to a clamp element for the pipings to protect the tubes, the clamp element is provided thereon with: a clamp support having first and second end portions and at least one clamp element attached thereto, said first end portion being bent to protrude away from the remainder of said clamp support;

tube protecting means having a spring portion, a recess portion and an engageable end portion, said spring portion biasing said first end portion of said clamp support into engagement with said recess, said second end portion of said clamp support engaging said engageable end portion of said tube protecting means.

The present invention contemplates that the tube protecting means has an opening through which said second end portion is passed to engage said engageable end portion.

The present invention contemplates that the tube protecting means has a slit through which said second end portion is passed to engage said engageable end portion.

The present invention contemplates that the tube protecting means has a blind hole through which said second end portion is passed to engage said engageable end portion.

The present invention contemplates that said spring portion is integrally formed on the tube protecting means.

The present invention contemplates that said tube protecting means is formed such that when said second end portion of said clamp support is passed through said opening of said tube protecting means, and said recess is engaged with said first end portion, said recess is resiliently flared along an outer surface of said first end portion, such that said recess is engaged with said first end portion in a manner to cover said first end portion.

The present invention contemplates that each second end portion of said clamp support and said engageable end portion of said tube protecting means is provided with a locking hole for locking against a vehicle body both end portions by use of a bolt or the like extending therethrough in such a manner that both end portions are aligned with each other.

The present invention contemplates that said tube protecting means is provided with an escaping hole for accommodating a projection projecting from said clamp support when said clamp element is mounted to said clamp support.

According to the present invention, the tube protecting means is engaged at opposite ends in the widthwise direction with the clamp support mounted to the clamp element for the pipings and the spring portion provided at the inner side of the tube protecting means biases the tube protecting means in a direction of separating the tube protecting means from the clamp support, so that the tube protecting means can be firmly secured to the clamp support to be reliable and controlled in its shift in position.

Furthermore, the tube protecting means is mounted to the clamp support in such a process that the tube protecting means is pressed so as to be resiliently flared, so that the mounting operation can be facilitated.

DETAILED DESCRIPTION OF THE PREFERRED EMBODIMENT

Figure 1:
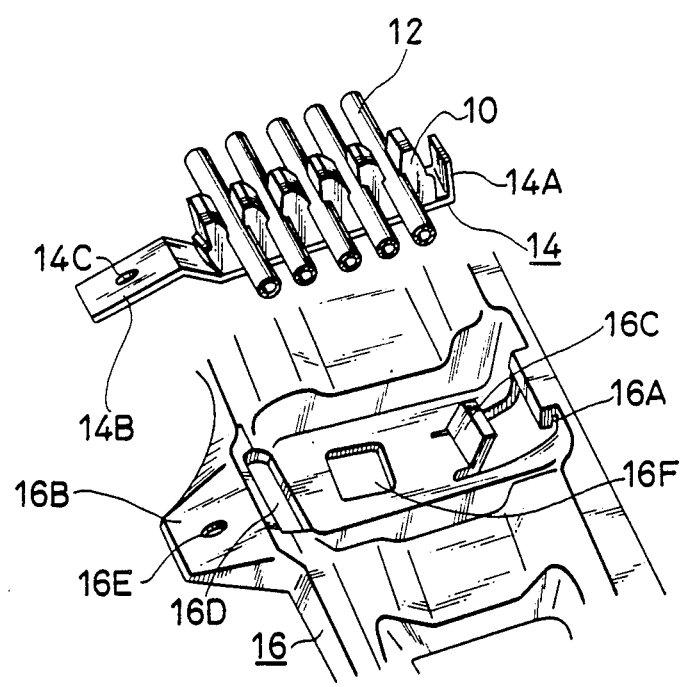
FIG. 1 is a disassembly perspective view showing one embodiment of a tube protecting device according to the present invention.
Figure 2:
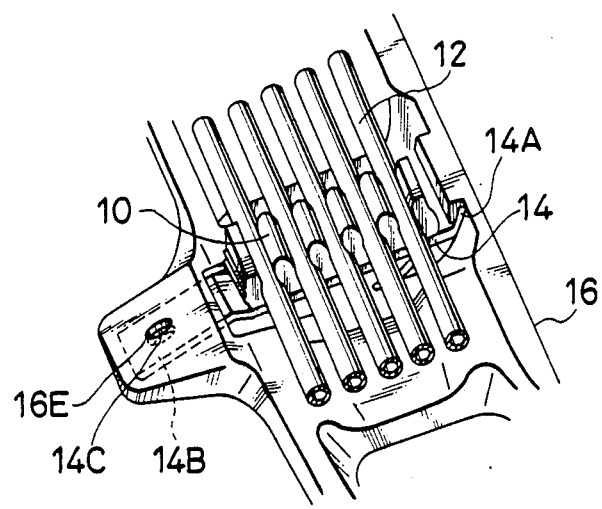
FIG. 2 is a perspective view showing the assembled state of the above-mentioned embodiment.
Figure 3:
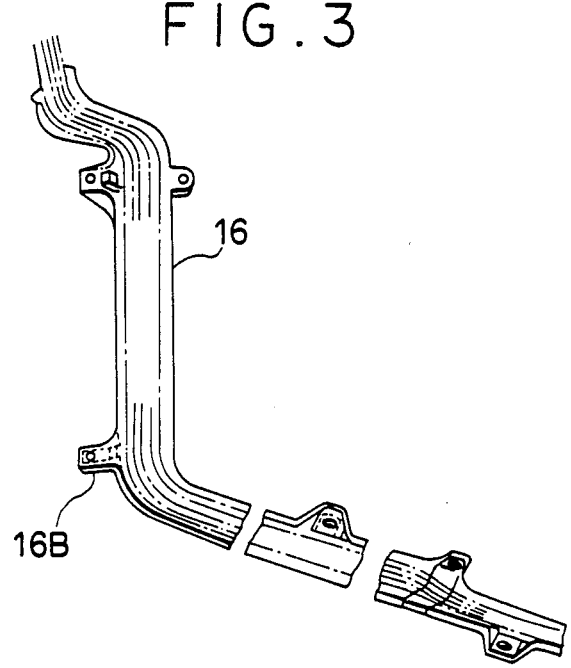
FIG. 3 is a perspective view showing the tube protecting means in the above-mentioned embodiment.

Description will hereunder be given of one embodiment of the present invention with reference to the drawings. As shown in FIGS. 1 to 3, according to this embodiment, in a tube protecting device for covering under surfaces of a plurality of tubes 12 fixed to a clamp element 10 for the pipings to protect the tubes 12, the clamp element 10 is provided thereon with a clamp support 14 mounted from outside (underside), one end of which in the widthwise direction thereof is inwardly (upwardly) bent to provide a first end portion 14A; and a tube protector 16 having a recess 16A engageable with the first end portion 14A of the clamp support 14, an engageable end portion 16B engageable from inside with a second end portion 14B of the clamp support 14 and a spring portion 16C for biasing the outer (under) surface of the clamp supprot 14 when the tube protecting means 16 is engaged with the clamp support 14 through the recess 16A and the engageable end portion 16B.

The tube protecting means 16 is formed with an opening 16D at a position close to the inner (upper) side of the engageable end portion 16B in the widthwise direction thereof, for permitting the second end portion 14B of the clamp support 14 to extend therethrough and reach the outer side of the tube protecting means 16.

Here, the spring portion 16C is integrally formed on the main body of tube protector 16 in a shape to cut upward through a portion of the tube protecting means 16 made of synthetic resin or the like.

Reference numerals 14C and 16E in FIGS. 1 to 3 designate locking holes formed at the forward end positions of the second end portion 14B of the clamp support 14 and of the engageable end portion 16B of the tube protecting means 16, for locking against a vehicle body the both end portions by use of a bolt 18 or the like extending therethrough in such a manner that the both members are aligned with each other.

Furthermore, reference numeral 16F in FIG. 1 designates an escaping hole for accommodating a projection 10A (Refer to FIG. 4) projecting from the outer surface of the clamp support 14 when the clamp element 10 is mounted to the clamp support 14.

As shown in FIG. 3, the tube protecting means 16 is formed along the longitudinal direction of the tubes 12, and the recess 16A and the hole 16F are formed at suitable intervals in the intermediate portion of the tube protecting means 16 in a manner to be aligned in the widthwise direction of the tube protecting means 16.

Furthermore, a plurality of clamp elements 10 and a plurality of clamp supports 14 are intermittently disposed in the longitudinal direction of the tubes 12 as opposed to the positions of the recess 16A and the hole 16F, which are formed in the tube protecting means 16.

A description will be given below of the process of covering the tubes 12 by the tube protecting means 16 and mounting the tubes to the vehicle body.

Figure 4:
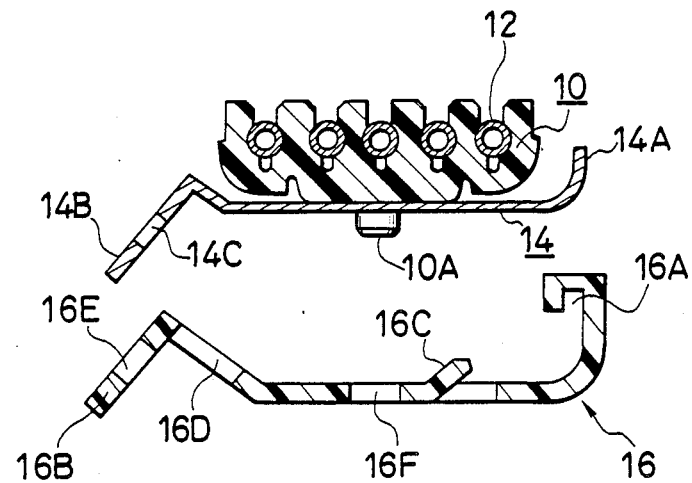
FIGS. 4 to 6 are sectional views showing the process of mounting the tube protecting means.
Figure 5:
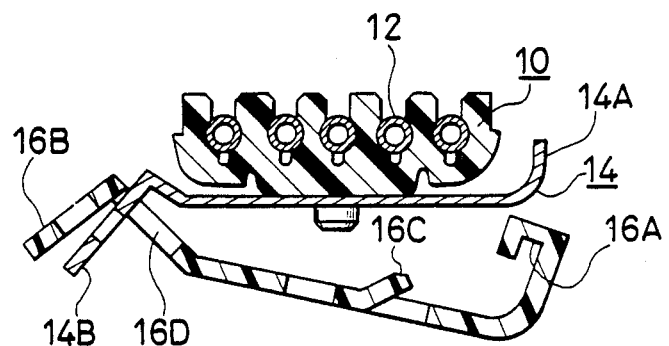

First, the tubes 12 are secured thereto with the clamp element 10 and the clamp support 14 integrally formed therewith, opposed to the tube protecting means 16 from above (Refer to FIG. 4). Subsequently, the second end portion 14B of the clamp support 14 is passed through the opening 16D of the tube protecting means 16, and the side of the recess 16A of the tube protecting means 16 is lifted from below the first end portion 14A of the clamp support 14 along the outer surface of the first end portion 14A (Refer to FIG. 5). The side of the recess 16A thus lifted is resiliently flared along the outer surface of the first end portion 14A, and thereafter, the recess 16A is engaged with the first end portion 14A in a manner to cover the first end portion 14A.

Figure 6:
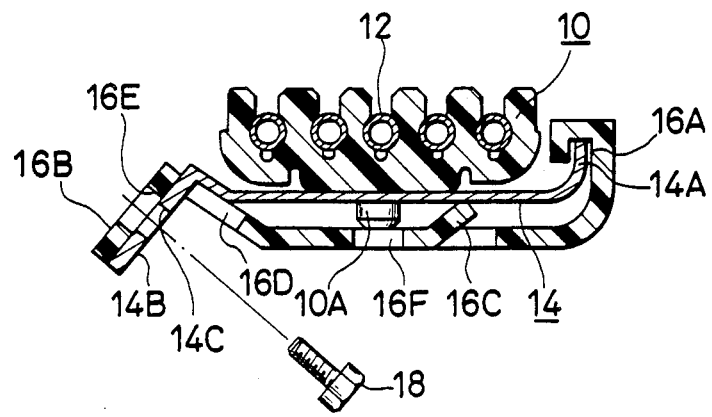
Figure 7:
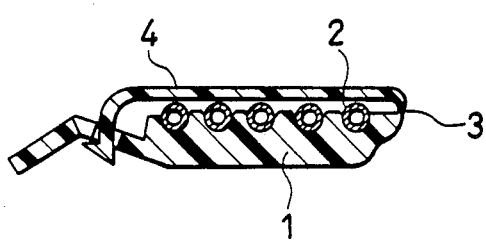
FIG. 7 is a sectional view showing the conventional tube protector.

At the same time, the second end portion 14B of the clamp support 14 is closely attached to the outer side (underside in the drawing) of the engageable end portion 16B of the tube protecting means 16 (Refer to FIG. 6). Then, the spring portion 16C of the tube protecting means 16 strongly presses the outer surface of the clamp support 14, whereby the tube protecting means 16 is biased downward in the drawing, so that the recess 16A and the engageable end portion 16B are firmly engaged with the first end portion 14A and the second end portion 14B, respectively, due to the reaction force of the resiliency.

In consequence, the tube protecting means 16 is reliably fixed to the clamp support 14.

Furthermore, the tube protecting means 16 is regulated in its movement in the widthwise direction thereof by its engagement with the clamp support 14 through the recess 16A and the engageable end portion 16B thereof, so that its shift in position is small.

The tubes 12 and the tube protecting means 16 as in the state shown in FIG. 6 are lifted to the undersurface of the vehicle body, and the bolt 18, is passed through a locking hole 14C of the clamp support 14 and a locking hole 16E of the tube protecting means 16, with both holes 14C and 16E being aligned with each other, and thereafter, the clamp support 14 and the tube protecting means 16 are locked against and fixed to the vehicle body, thus completing the mounting operation.

Additionally, in the above-described embodiment, the tube protecting means 16 is formed with the opening 16D, through which the second end portion 14B of the clamp support 14 is passed and extended to the outer side of the tube protecting means 16, however, any other arrangement can be used only if the second end portion 14B of the clamp support 14 can be engaged with the engageable end portion 16B from the outer side of the engageable end portion 16B of the tube protecting means 16. In consequence, for example, a slit or the like may be adopted, and further, a blind hole, into which the second end portion 14B can be inserted, may be used in place of the opening 16D.

Furthermore, the spring portion 16C may be a separate spring member without being integrally formed on the tube protecting means 16.

What is claimed is:

1. A tube protecting device comprising:
   a clamp support having a first end portion and a second opposite end portion with at least one clamp element attached therebetween for supporting an undersurface of at least one tube, said first end portion being bent to project away from the clamp support;
   tube protecting means removably attached to said clamp support and having a protection surface for covering at least an undersurface of said at least one tube, said protection surface having a recess portion and an opposite engageable end portion, a spring portion being located adjacent said recess portion for biasing said first end portion of said clamp support into engagement with said recess, and said second end portion of said clamp support into engagement with said engageable end portion of said tube protecting means, said spring portion being integrally formed on said tube protecting means and defined by a tab cut from said protection surface and projecting therefrom toward said clamp support.

2. The tube protecting device of claim 1, wherein said tube protecting means has an opening between said spring portion and engageable end portion through which said second end portion is passed to engage said engageable end portion.

3. The tube protecting device of claim 2, wherein said tube protecting means is formed such that when said second end portion of said clamp support is passed through said opening of said tube protecting means, and said recess is engaged with said first end portion, said recess is resiliently flared along an outer surface of said first end portion, such that said recess is engaged with said first end portion in a manner to cover said first end portion.

4. The tube protecting device of claim 1, wherein said second end portion of said clamp support and said engageable end portion of said tube protecting means further comprise locking holes.

5. The tube protecting device of claim 2, wherein said second end portion of said clamp support and said engageable end portion of said tube protecting means further comprise locking holes.

6. A tube protecting device of claim 1, wherein said protecting means is provided with an escaping hole for accommodating a projection projecting from said clamp support when said protecting means is mounted to said clamp support.

7. A tube protecting device of claim 2, wherein said protecting means is provided with an escaping hole for accommodating a projection projecting from said clamp support when said protecting means is mounted to said clamp support.

8. A tube protecting device of claim 3, wherein said protecting means is provided with an escaping hole for accommodating a projection projecting from said clamp support when said protecting means is mounted to said clamp support.

9. A tube protecting device of claim 4, wherein said protecting means is provided with an escaping hole for accommodating a projection projecting from said clamp support when said protecting means is mounted to said clamp support.

* * * * *